(12) United States Patent
Mosby et al.

(10) Patent No.: US 11,868,483 B2
(45) Date of Patent: *Jan. 9, 2024

(54) DEVICE-BASED SECURITY SCORING

(71) Applicant: Lookout Inc., San Francisco, CA (US)

(72) Inventors: Victoria Ashley Mosby, Frederick, MD (US); Bastien Bobe, Mogneneins (FR); Brian James Buck, Livermore, CA (US); Katelyn Clifford, Boston, MA (US)

(73) Assignee: LOOKOUT INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,127

(22) Filed: Nov. 8, 2022

(65) Prior Publication Data
US 2023/0070546 A1    Mar. 9, 2023

Related U.S. Application Data

(63) Continuation of application No. 16/810,405, filed on Mar. 5, 2020, now Pat. No. 11,537,721.

(51) Int. Cl.
| | |
|---|---|
| *H04L 29/06* | (2006.01) |
| *G06F 21/57* | (2013.01) |
| *G06F 21/56* | (2013.01) |
| *G06N 20/00* | (2019.01) |

(52) U.S. Cl.
CPC .......... *G06F 21/577* (2013.01); *G06F 21/566* (2013.01); *G06N 20/00* (2019.01); *G06F 2221/033* (2013.01); *G06F 2221/034* (2013.01)

(58) Field of Classification Search
CPC ................ G06F 21/577; G06F 21/566; G06F 2221/033; G06F 2221/034
USPC .......................................................... 726/23
See application file for complete search history.

(56) References Cited

U.S. PATENT DOCUMENTS

| | | | | |
|---|---|---|---|---|
| 10,803,186 | B2* | 10/2020 | Considine | ................ G06F 8/70 |
| 11,133,929 | B1* | 9/2021 | Shahidzadeh | ......... H04L 9/0891 |
| 11,321,774 | B2* | 5/2022 | McKenna | .............. G06N 20/00 |
| 2021/0051015 | A1* | 2/2021 | Widmann | ............. H04L 9/0866 |

* cited by examiner

*Primary Examiner* — Evans Desrosiers
(74) *Attorney, Agent, or Firm* — David R. Stevens; Stevens Law Group

(57) ABSTRACT

Applications on a device are assigned scores based on their attributes, update status, and source. A device is a assigned a score based on its attributes and the scores of applications installed thereon. the device score may be combined with an evaluation of user behavior to obtain a user score. The scores may be used to invoke security actions with respect to data and services of an enterprise. Security reports for a network environment may be modified such that the severity of threats accounts for policies and attributes of the environment. Security of a device may be evaluated locally, including the training of a model to identify anomalous authentication or usage behavior. Security of a device may be reduced to a score lacking personal information that may be used by a server to select access controls for a device.

14 Claims, 12 Drawing Sheets

Motivation

Transparency

Details

| Lookout | Business |

Security Score
880

SECURITY SCORE CATEGORIES:

Device Risk 760 Details
App Behavior 820 Details
Network Behavior 990 Details
Browsing Behavior 950 Details
Authentication Behavior 830 Details
User Behavior 870 Details

DEVICE-BASED SECURITY SCORING

RELATED APPLICATIONS

This application is a continuation of U.S. patent application Ser. No. 16/810,405, filed Mar. 5, 2020.

BACKGROUND

In a modern enterprise, there is a wide array of devices in use by members of the enterprise, all of which may store or generate sensitive data. It is in the interest of the enterprise to protect the security of its data on each device on which it may be found. However, some devices may also be used for personal matters by a member of the enterprise or while the member of the enterprise is conducting personal matters.

Accordingly, there is a need to balance the need for security with protection of privacy.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 10, 11, and 12 illustrate interfaces for promoting device security in accordance with an embodiment of the present invention;

DETAILED DESCRIPTION

Figure 1:
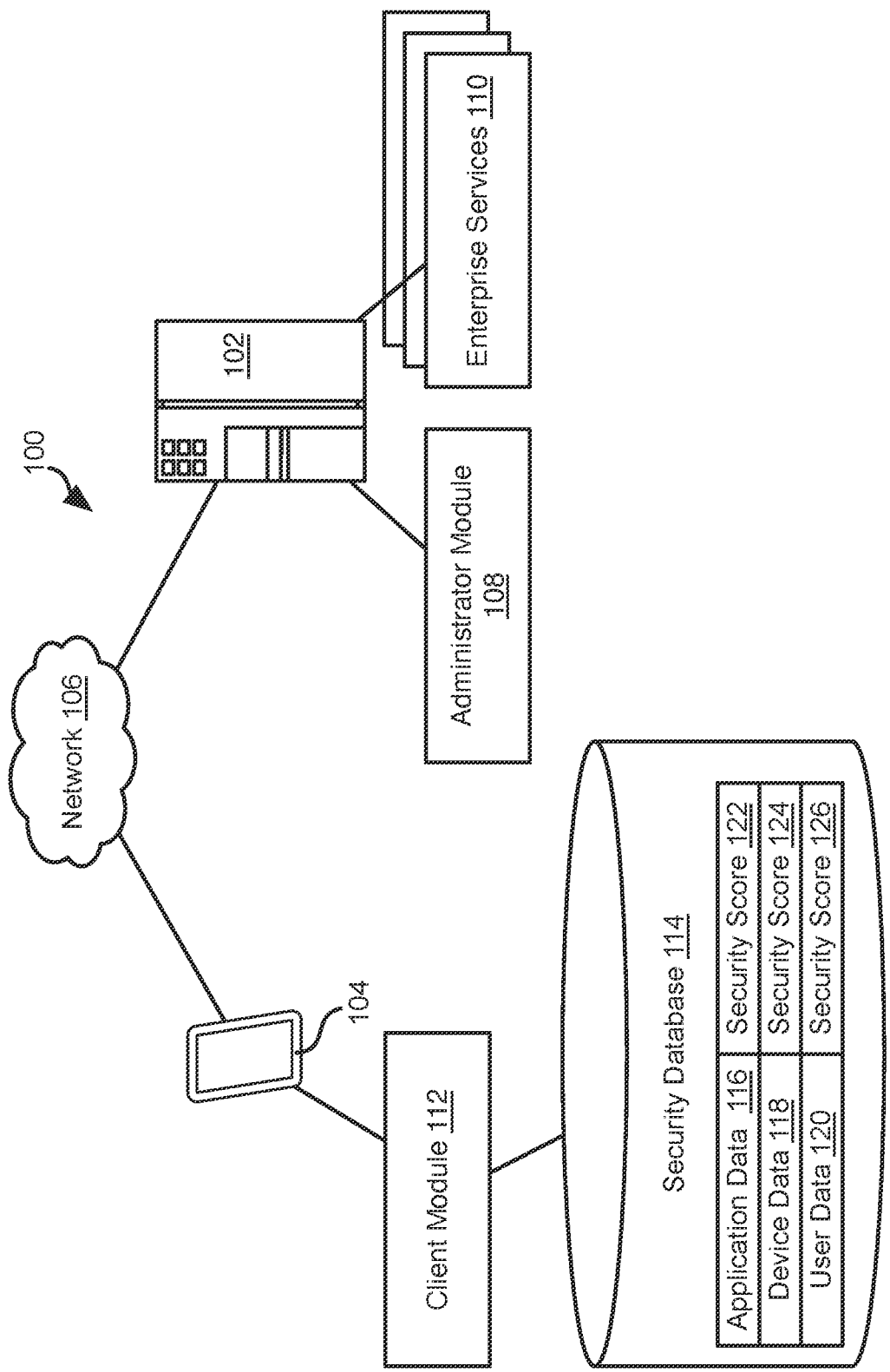
FIG. 1 is a schematic block diagram of a network environment for performing methods in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Objective-C, Swift, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 illustrates a network environment 100 of an enterprise in which the systems and methods disclosed herein may be implemented. The network environment 100 may include a server system 102 that includes one or more computers.

Members of the enterprise may use various devices 104 that may be embodied as mobile phones, tablet computers, laptop computers, desktop computers, wearable computers, personal digital assistants (PDA), electronic book or book reader, digital camera, digital video camera, video game console, voice controlled assistant, drone, unmanned aerial vehicle (UAV), robot, robotic appliance, smart television, set top box, router, cable modem, ambient computing device (located in a mostly fixed location and available to multiple users located in the vicinity of the device, e.g. a smart room), a computing device embedded in a vehicle (automobile, plane, etc.), ingestible or body-implanted devices, smart fabrics or clothing, or other computing devices.

The systems and methods disclosed herein are particularly applicable where at least a portion of the devices 104 are mobile and can be expected to change location over time. The mobile devices 104 may execute a mobile operating system. Mobile devices can also include devices in automobiles, planes, or other vehicles, such as an embedded computing or communication system that communicates via the Internet over a cellular phone system or Wi-Fi or other communications technologies, or other portable computing devices (e.g., devices that pair with a mobile device using Bluetooth, such as an Apple watch).

Additional examples of mobile devices include devices that are part of what is called "the internet of things" (IoT). In the IoT there are multiple devices which operate without accompanying and attendant users. Such devices can be mobile or sessile; they can have various sensors and computing and communication capabilities and can run applications; schematically they can be considered substantially similar to a mobile device. One will appreciate that the mobile devices described herein may include any computer or computing device running an operating system for use on handheld or mobile devices, such as smartphones, PDAs, tablets, mobile phones and the like. For example, a mobile device may include devices such as the Apple iPhone®, the Apple iPad®, or any device running the Apple iOS™, Android™ OS, Google Chrome™ OS. As used herein, the mobile communication device may also be referred to as a mobile computing device, a mobile client, or simply, as a device or as a client.

The user devices 104 may also be desktop computers or other server computers executing an operating system. User devices can include devices such as a smartphone, a laptop computer, a desktop computer, a mobile device, a wearable computing device, a personal digital assistant (PDA), a tablet computer, an electronic book or book reader, a digital camera, a video camera, a video game console, a voice controlled assistant, a drone, a UAV, a vehicle, a personal robot, a robotic appliance, a smart TV, a set top box, a router, a cable modem, a tablet, a server, a thing in IoT, an ambient computing device (located in a mostly fixed location in a room or location, available to multiple users located in the vicinity of the device, smart rooms, etc.) and/or any other suitable computing device.

The devices 104 may interact with the server system 102 by way of a network 106, such as a local area network (LAN), wide area network (WAN), the Internet, or any other type of wired or wireless network connection (e.g., 2G, 3G, 4G, 5G). Mobile devices 104 may communicate via the Internet over a cellular data network, WI-FI or other communications technologies, or other portable computing devices (e.g., devices that pair with a mobile device using BLUETOOTH, such as a smart watch).

The server system 102 may function as a security server. For example, the server system 102 may include an administrator module 108 that functions an Identity Access Management (IAM) server, or a device management server (such as an MDM (mobile device management) server or an EMM (enterprise mobility management) server. The server system 102 may implement one or more enterprise services 110, such as file servers, database servers, or other custom server applications performing functions specific to the enterprise. The mobile device 104 may further access other services provided by third parties for the benefit of the enterprise.

The user device 104 may execute a client module 112 programmed to interface with the administrator module 108 in order to monitor security of the device 104 and implement security procedures and policies. The client module 112 may collect data regarding a state and usage of the device 104. This data may be stored in a security database 114 and may include application data 116 describing applications installed on the device 104 and their state and usage. The database 114 may store device data 118 that includes data regarding the health and security of the device 104. The database 114 may store user data 120 that records usage of the device 104 and its applications by the user of the device 104. For example, the user data 120 could include behavior data of the user describing actions of the user that affect the security of the device 104. The user data 120 may further include network data, i.e. data describing network resources accessed by the user and traffic processed by the device 104.

The client module 112 may analyze the data 116, 118, 120 in order to calculate corresponding scores 122, 124, 126 indicating the level of risk indicated by the data 116, 118, 120. Note that these scores may be numerical values, e.g. each be a single number within a range of values with its magnitude indicating a level of risk. For example, a high score may indicate high risk. Alternatively, the scores 122, 124, 126 may be calculated such that a high score indicates a high level of security and a low level or risk. The scores 122, 124, 126 do not include any information from the data 116, 118, 120 that would describe the activities of the user recorded in the data 116, 118, 120 or that could be used to infer the activities or personal data of the user.

The scores 122, 124, 126 may be provided to the administrator module 108, which may invoke the client module 112 and/or enterprise services 110 to perform security actions based therein where one or more of the scores 122, 124, 126 indicate an unacceptable level of risk. Such security actions may include:

Blocking the device 104 from accessing the server 102 or one or more of the services 110

Requiring re-authentication or two-factor authentication to access one or more of the services 110

Entirely blocking access by the device 104 until issues are resolved.

Blocking access by particular applications or from certain ports of the device 104.

Initiating the uninstall or removal of a particular application or applications from the device.

Each of these actions may be associated with threshold condition for a score 122, 124, 126 (e.g., above or below a particular value or within a particular range of values) such that when a score 122, 124, 126 meets the threshold condition associated with an action, that action is invoked.

Figure 2:
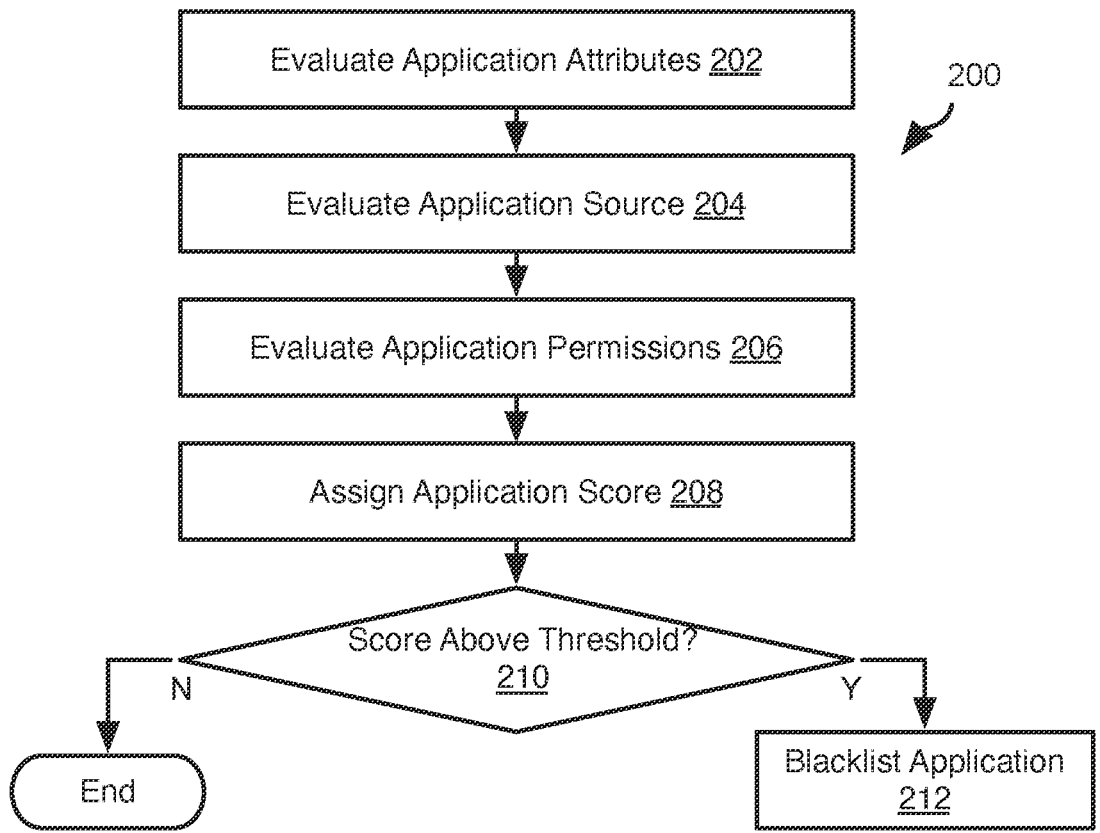
FIG. 2 is a process flow diagram of a method for assigning a security score to an application in accordance with an embodiment of the present invention.

FIG. 2 illustrates a method 200 for calculating an application score 122 for an application executing on the device 104. The method 200 may include evaluating 202 attributes of the application itself. This may include the version of the application, i.e. the version relative to the latest version for that application, time elapsed since a last update, or an average frequency of updates. This may also include evaluating software developer's kits (SDK) or third-party libraries included in the application, particularly reputation scores indicating the reliability and security of the SDKs or libraries, or how up-to-date the versions of the SDKs or libraries are. Step 202 may further include evaluating communication of the application, specifically, whether and to what degree network communications of the application are encrypted (e.g., TLS (transport layer security), PFS (perfect forward security) and OWASP (open web application security project)).

The method 200 may further include evaluating 204 a source of the application. For example, signers of applications may have reputation scores associated therewith such that more established developers have higher reputation scores than new or unknown developers. In particular, if the signer is not assigned a reputation score, it may be assumed to be zero.

The method 200 may include evaluating 206 permissions granted to the application by the device 104, e.g., according to instructions of the user of the device granting the permissions. The permissions may include access to location services, a network, files, or other resources on the device 104.

The method 200 may include assigning 208 a score to the application according to the evaluations of steps 202, 204, and 206. For example, the result of each evaluation may be an intermediate score such that the intermediate scores may be summed or multiplied by one another to obtain a final application score. Alternatively, the intermediate scores may be input to a machine learning model trained to output the application score. In at least one embodiment, the intermediate scores can be weighted, for example a higher weight can be assigned to a score associated with application permissions, while a lower weight can be assigned to a score associated with developer.

For example, each attribute from step 202 may have a value assigned thereto indicating a level of risk (e.g., if present it indicates increased risk). Accordingly, the sum of the values for the attributes identified at step 202 may be the intermediate score from step 202. For step 204, the intermediate score may be the reputation score of the signer. For step 206, each permission granted may have a value associated therewith indicating the increase in risk associated with that permission. The sum of the values for the permissions identified at step 206 may be the intermediate score for step 206. In some embodiments, if certain factors are identified at an evaluation of steps 202, 204, and 206, the application is automatically assigned maximum score. For example, if the application is or includes known malware, it may be assigned a maximum score, e.g. 10.

In this example, the combination of the intermediate scores at step 208 may be such that a high score indicates higher risk and lower security. In other embodiments, values may be defined differently such that a higher score indicates lower risk and higher security.

In at least one embodiment, risk level can include a financial harm (e.g., financial risk cost). For example, if factor A is associated with a great financial loss then it can be assigned a higher weight and therefore a higher risk level than factor B when is associated with a low financial loss. The financial harm can be determined based on known data breaches, the information known about the user associated with a device (e.g., executive, federal agent, etc.), likelihood of occurrence, and/or the type of data that can be accessed/leaked as a result of the risk. The financial harm can be adjusted to include financial cost of breach, reputation cost, data breach fines (can be adjusted to enterprise), and/or productivity loss cost. In at least one embodiment, the risk level can include the personal harm risk. In at least one embodiment risk level can include the personal harm risk can include information about the user/device (e.g., government agent, reporter, human rights activist, military), and/or the type of information associated with the risk (e.g., location).

The method 200 may further include evaluating 210 the score with respect to a threshold condition. For example, if a higher score indicates a higher risk, step 210 may include evaluating whether the score is higher than a threshold. If so, the application may be blacklisted 212. Blacklisting may include some or all of denying access by the device 104 to enterprise services 110 while the application is on the device 104, denying network access to the device 104, denying access to location data or revoking other permissions of the application, or performing other actions to mitigate risk from the application.

Note also that the scores from step 208 may be assigned to categories, e.g. none (0.0=no risk), low (0.1-3.9), medium (4.0-6.9), high (7.0-8.9), critical (9.0-10.0). For example, an application that was downloaded from an application store and has not been updated for 18 months, was signed by a vendor with only one application, that has permissions to access contacts and file storage, is using four advertisement SDKs, with 90 percent of its communication being unencrypted using HTTP (hypertext transfer protocol), would be considered a high risk application. In contrast, an application from a well-known vendor, that is updated every month, has only one advertiser SDK, and only 5 percent of its communication unencrypted using HTTP would be considered low or no risk.

Figure 3:
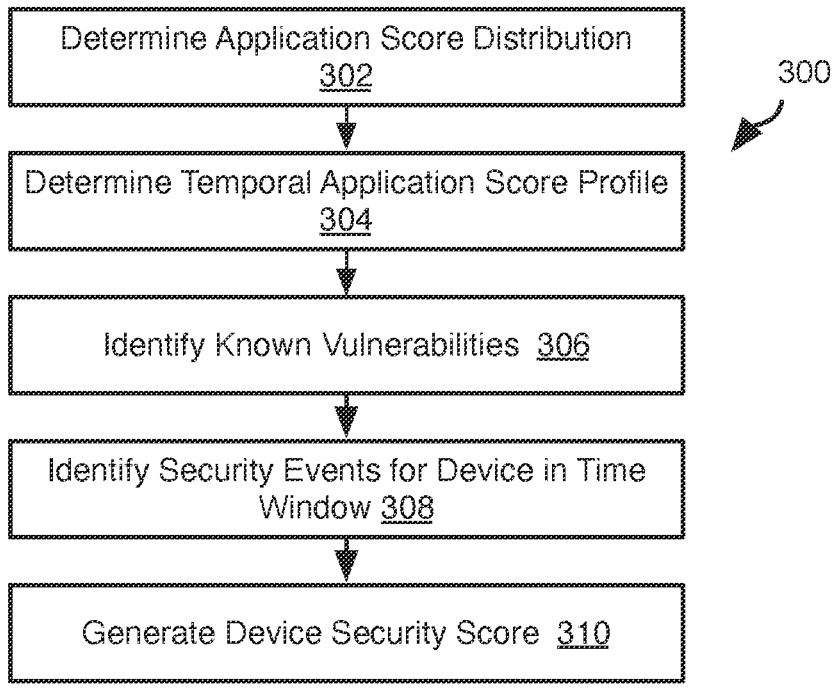
FIG. 3 is a process flow diagram of a method for assigning a security score to a device in accordance with an embodiment of the present invention.

FIG. 3 illustrates a method 300 that may be executed by the client module 112 in order to characterize the security of a device 104. The method 300 may include determining 302 an application score distribution, i.e. the scores of applications calculated according to the method 200. In particular, for each category (none, low, medium, high, critical), the number of applications in that category may be determined. Note that the application scoring approach of FIG. 2 is one example of application risk scoring. Other application scoring approaches such as CVSS (common vulnerability scoring system) 3.0 or the like may additionally or alternatively be used.

The method 300 may further include determining 304 a temporal application score profile, which may include evaluating change in the number of applications in each category over time within a time window, e.g. the application score distribution calculated at one week intervals over the last one to six months or some other time interval. In some embodiments, step 304 only evaluates those applications with highest risk, e.g., only the number of high and critical applications or only the number of critical applications.

The method 300 may include identifying 306 known vulnerabilities. These may include known vulnerabilities for installed versions of some or all of the operating system, browser, or other applications installed on the device 104. The vulnerabilities identified 360 may also include hardware or firmware vulnerabilities of the device 104 itself. In some embodiments, vulnerabilities may be rated according to criticality (e.g., low, medium, high, critical). Step 306 may include identifying those vulnerabilities with a high degree of criticality (e.g., high and critical vulnerabilities). Vulnerabilities may be described and their criticality reported in CVEs (common vulnerabilities and exposures) as known in the art.

The method 300 may include identifying 308 a number of security events on the device 104 that were detected during a time window, e.g. the last two to four weeks or some other time interval. Security events may include detection of attempts to install malware, blocking of attempts to access a suspect web address (uniform resource locator (URL) or domain) (e.g., phishing site), intrusion attempts received over a network, or other security related events. These events may also be assigned criticality and those with certain levels of criticality may be identified at step 308 (e.g., medium, high, and critical).

The method 300 may further include generating 310 a device security score according to steps 302-308. For example, the result of each step 302-308 may be an intermediate score and the intermediate scores may be summed to obtain the score at step 310.

For example, the application score distribution of step 202 may be used to calculate an intermediate score by weighting each number of applications for each risk category and summing the weighted numbers, with the weight increasing with criticality from none to critical.

The temporal application score profile from step 304 may yield an intermediate result according to a function that increases with a rate of increase in the number of high risk applications such that the increase is greater for increase in the number of critical risk applications than for the number of high risk applications.

The intermediate value for step 306 may be obtained by weighting the number vulnerabilities of each risk category and summing the weighted numbers, with higher risk vulnerabilities being weighted more than lower risk vulnerabilities.

The intermediate value for step 310 may be obtained by weighting the number of events of each risk category and summing the weighted numbers, with higher risk events being weighted more than lower risk vulnerabilities.

The device security score from step 310 may be provided to the administrator module 108 and may be used to, for example, display the security of the device 104 on a dashboard displayed to an administrator. The device security score may also be used to invoke some or all of the security actions described herein above if the device security score is found to meet a threshold condition. For example, if the device security score is above a threshold value, the device 104 may be blocked from accessing enterprise service 110 until the device security score is brought below the threshold value by removing high risk applications or malware, fixing vulnerabilities, or other remedial actions.

Figure 4:
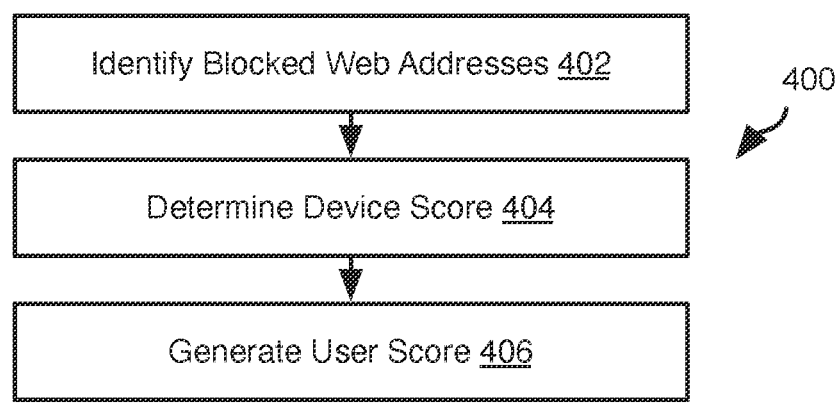
FIG. 4 is a process flow diagram of a method for assigning a security score to a user in accordance with an embodiment of the present invention.

FIG. 4 illustrates a method 400 that may be executed by the client module 112 in order to characterize the overall risk posed by a device 104 in combination with risk introduced by activities of a user with respect to the device 104.

The method 400 may include identifying 402 a number of web addresses (URLs, domains, and/or IP addresses) that have been blocked by security software on the device 104 within a time window, such as the last two to four weeks. Such web addresses may include those blocked as being for phishing sites or sites with offensive content. The method 400 may further include calculating 404 a device security score, such as according to the method 300 of FIG. 3. The user score may then be generated 406 as a combination of the value at step 402 and the device security score form step 404, e.g. a sum or weighted sum of the values from steps 402 and 404. In some embodiments, there may be multiple such user scores, each calculated using more fine-grained classifications, e.g., "Adult/Gambling."

The user score from step 406 may be provided to an administrator by way of the administrator module 108 that displays the user score on a dashboard. If the user score is above a threshold indicating unacceptable risk some or all of the security actions described above may be invoked such as blocking the user from accessing enterprise service 110 until the user score is brought below the threshold value by removing high risk applications, fixing vulnerabilities, or other remedial actions. In at least one embodiment, the cost of potential risk associated with the user and/or device can be indicated. For example, if the user has access to highly sensitive data and had engaged in a set of behaviors that are associated with a high risk level, calculation can be performed factoring in the cost of typical breach associated with the type of sensitive data associated with the user and/or the frequency of risky behaviors (a monetary value associated with those risk can be provided). In at least one embodiment, when a financial risk cost associated with a user/device exceeds a threshold, remedial action can be taken (e.g., blocking access, required training etc.). In at least one embodiment, when a personal harm risk associated with a user/device exceeds a threshold, remedial action can be taken (e.g., blocking access, required training etc.).

Figure 5:
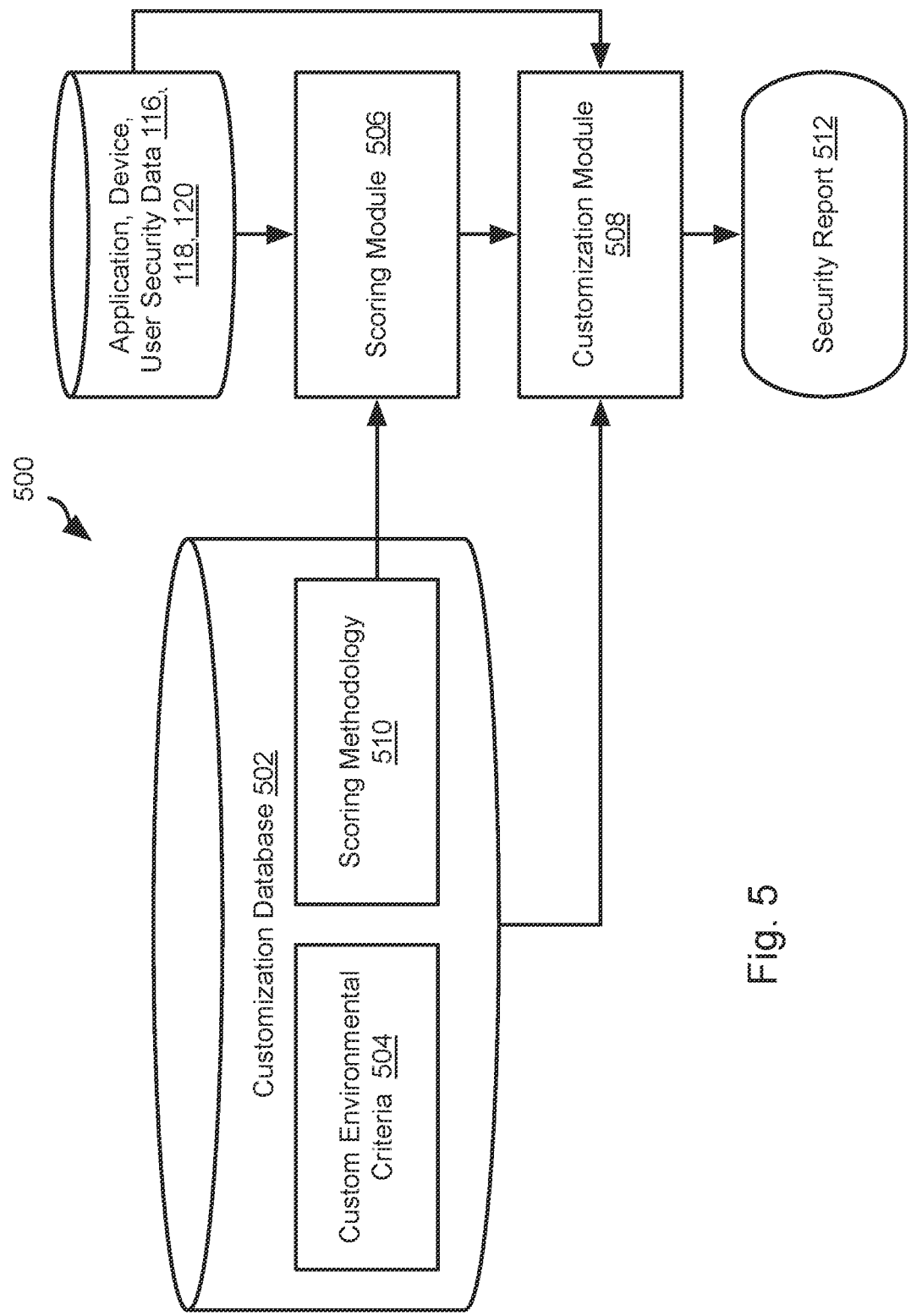
FIG. 5 is a schematic block diagram illustrating customization of security reports in accordance with an embodiment of the present invention.
Figure 6:
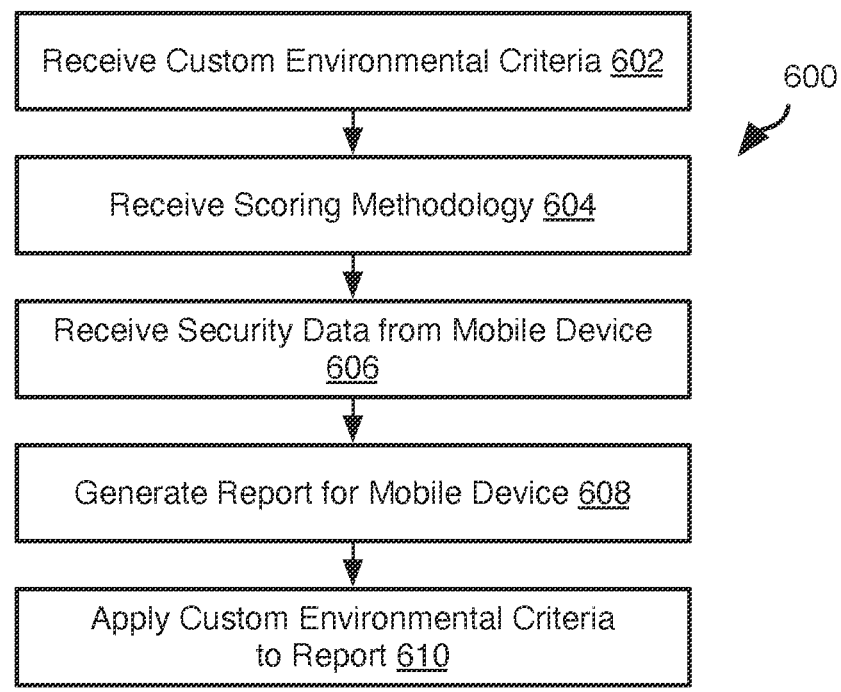
FIG. 6 is a process flow diagram of a method for generating customized security reports in accordance with an embodiment of the present invention.

Referring to FIGS. 5 and 6, the security risk of an application, operating system, or device may be determined using the illustrated approach. In particular, the approach for evaluating vulnerabilities described below with respect to FIGS. 5 and 6 may be used in place of or in combination with the approach of FIGS. 1 through 4. The risk associated with an application may be determined using the approach of FIGS. 5 and 6 as part of the method 200 to determine the application score for the application. For example, step 202 may include evaluating vulnerabilities of the application scored according to the approach of FIGS. 5 and 6. Likewise, vulnerabilities scored according to the approach of FIGS. 5 and 6 may be used to invoke security actions described above where the level of criticality of the vulnerability corresponds to that associated with the security action as described above.

Vulnerability scoring models as known in the art are not accurate for mobile devices. For example, if a mobile device has a compromised application the device will be identified as high risk according to existing models despite the enterprises policy that does not allow that application to access enterprise data. A common vulnerability scoring methodology in industry is the Common Vulnerability Scoring System (CVSS) methodology that outputs reports known as common vulnerabilities and exposures (CVE). However, this approach is very network and system oriented in its approach (i.e. firewalls, application servers, database, etc.). The CVSS methodology is not as capable of taking into account mobile endpoint vulnerabilities.

The system 500 of FIG. 5 facilitates the evaluation of risk data in view of enterprise policies. In particular, a customization database 502 may be provided that stores custom environmental criteria 504 reflecting policies and configuration of the enterprise server 102 and services 110 that impact the risk posed by user devices 104 accessing the server 102 and services 110. The custom environmental criteria 504 may indicate such things 1) whether devices 104 accessing the server 102 and services 110 are managed or unmanaged (e.g., include a client module 112 as described herein or other mobile device management (MDM) executing thereon; 2) permissions of the applications executing on the device 104; 3) the operating system(s) that are installed on the devices 104 of the enterprise; 4) the level of threat of a vulnerability found in an application on the device 104; 5) stack threat of the vulnerability (i.e., at what point in the enterprise service stack the vulnerability exists, front end, back end, etc.); and 6) other enterprise policies.

The custom environmental criteria 504 may be used in combination with a scoring module 506. The scoring module 506 may implement an existing vulnerability scoring system such as the CVSS methodology or other future industry recognized scoring methodologies. The CVSS methodology is used by industry and government organizations to rate the severity of vulnerability into a quantifiable risk score. This score and the components that make it up within the CVSS calculator allow potentially impacted customers and consumers to understand the risk and scope of the vulnerability, how it might impact their environment, and provide context for prioritizing fixing or monitoring the risk. The CVSS methodology may be applied to vulnerabilities in applications, operating systems, firmware, and hardware. Alternatively, or in addition, the scoring module 506 may implement a scoring methodology that employs the MITRE ATT&CK™ Framework categories.

The output ("base score") of the scoring module 506 may be combined with the custom environmental criteria 504 by a customization module 508. The customization module 508 applies the criteria 504 to the base score to customize the severity score based on environment-specific characteristics of a given enterprise. For example, the base score of a vulnerability may be 8.5 (High), using this as a baseline, an enterprise may apply environmental and temporal factors specific to their environment as reflected in the criteria 504 to the CVSS score, which may then, for example, drop the base score down to a modified score of 6.0 (Moderate). This ability to take a base score and to account for specific environmental controls of an enterprise allows one to truly understand how a vulnerability affects the enterprise's risk posture.

In CVSS v.3.1, a base score is calculated according to an impact sub-score equation and an exploitability sub-score equation:

Impact Sub Score Equation:
  if (Impact sub-score <= 0) 0 else
    Scope Unchanged4  Roundup(Minimum[Impact + Exploitability), 10])
    Scope Changed     Roundup(Minimum[1.08  x  (Impact + Exploitability), 10])

Exploitability Sub Score Equation:

Scope Unchanged $6.42 \times ISC_{Base}$

Scope Changed $7.52 \times [ISC_{Base} - 0.029] = 3.5 \times [ISC_{Base} - 0.02]^{15}$ Where $ISC_{Base}$ is defined as:

$ISC_{Base} = 1 - [(1 - \text{Impact}_{Conf}) \times (1 - \text{Impact}_{Integ}) \times (1 - \text{Impact}_{Avail})]$ $\text{Impact}_{Conf}$, $\text{Impact}_{Integ}$, and $\text{Impact}_{Avail}$ are estimates, which may human generated of the impact of a vulnerability on confidentiality, data integrity, and device availability.

These equations may be modified based on the custom environmental criteria. In particular, where a vulnerability does not have an impact on confidentiality, data integrity, or device availability as defined in the custom environmental criteria 504, these values may be adjusted in order to obtain modified Impact Sub Scores and Exploitability Sub-Scores.

A conventional report according to CVSS v3.1 may also include a temporal score that may likewise be adjusted according to the custom environmental criteria 504. The temporal score provides an estimate of whether a given risk has been confirmed (seen in the wild) or simply theoretical (lab-only), whether a remediation is already available (patched) or not (newly discovered, not patched), etc.

The custom environmental criteria 504 may be used by the customization module to augment the report of the base score and temporal score. For instance, for patched CVE reports from IOS/ANDROID (or other operating system or firmware), when the user drills into a specific CVE, the user could be shown (1) the base risk score, (2) known temporal factors (patched, confirmed, etc.), and additionally (3) a custom risk score based on their pre-selected custom environmental criteria 504 applied to that CVE. In at least one embodiment, the user can be shown a financial harm associated with the risk score, and/or the personal harm risk that can be adjusted to include information about the user/device (e.g., government agent, reporter, human rights activist, military, executive), and/or the type of information associated with the risk (e.g., location, company financials).

CVEs may list vulnerabilities of the device 104 relating to the operating system and security patches. CVEs may be calculated using the CVSS methodology described above and may include the data used to obtain scores. A CVE may include a CVE number (e.g., identifier) and a non-quantified severity rating (low, moderate, high, critical, or unknown). There may be a dictionary of CVEs recording publicly disclosed cybersecurity vulnerabilities and exposures that is free to search, use, and incorporate into products and services. In some embodiments, the client module 112 or administrator module 108 may obtain the CVEs identified and subsequently patched by a manufacturer of the device 104 or provider of its operating system (e.g., mobile operating system).

A listing of CVEs for a device 104 provides an administrator with the ability to understand the security risks to their respective user base and environment, however in any given patch or update there may be hundreds of CVEs that have been patched. Security administrators struggle with the ability to review and ingest such a large amount of data. Additionally, the CVEs and severity scores they are presented with do not take into consideration their respective environmental controls. This leaves them with the manual task of having to individually review each CVE and identify how it truly impacts (or doesn't impact) their environment.

The custom environmental criteria 504 applied by the customization module 508 provide an internal mechanism to allow administrators to set environmental criteria about their mobile devices 104, information technology (IT) policies, etc., that can be automatically ingested and used to calculate custom severity scores and reports with respect to CVEs of devices 104 of the enterprise. In some embodiments the customization results, environmental criteria, and/or results of reviewing individual CVEs from one or more other organizations may be shared (anonymously, or in aggregate, or by industry sector, or attributed to organization by name, or from an industry sector organization, such as any of the sector-based Information Sharing and Analysis Centers (ISACs)) to provide an administrator with information about how other organizations have chosen to score or deal with this information.

In some embodiments, which of the customization results, environment criteria, and/or results of reviewing individual CVE can be shared may be based on a plurality of factors. For example, a determination of whether certain information is shared may be based on decisions that favor the security risk aversion over the privacy settings of any individual and/or sets of individuals (e.g., enterprises). In this example, should a risk or risk type be prioritized as "very dangerous," a risk response from one individual or set of individuals might be shared with the plurality even if the profile associated with the individual(s) did not specifically authorize sharing information with the entire plurality. In an example, if a device is associated with a CVE that represents immediate danger (e.g., device being tracked by foreign intelligence; can be based on a personal harm score), the administrator can be provided with information about the device so that action can be taken immediately. In at least one embodiment, when a device is determined to be associated with a CVE above a threshold level (e.g., dangerous), the device user can be notified of the danger and/or an action (e.g., blackhole network connect, uninstall app, block network connectivity to application with high risk level, revoke access) that can be taken on the device to mitigate the risk.

The custom environmental criteria 504 may be generated by the administrator module 108 in response to receiving responses from the administrator to a series of relevant questions about their environment and how they manage their users and devices 104. These answers should then be used as factors when calculating the custom risk score of a given CVE for their specific environment. The following are examples of environmental questions that should be made available to administrators when setting up their client modules 112:

Are the devices 104 of the enterprise corporate-owned only, BYOD (bring your own device) only, or a mix?

If mixed, what is the ratio: 50/50? 80/20 corporate? Or 80/20 BYOD?

Are you running IOS only? ANDROID only? Or both? Or other operating systems?

Do you have custom applications in your environment?

Are users allowed to select and install personal applications?

Do you use a corporate VPN (virtual private network)?

If managed, do you have IT policies in place that restrict the usage of the device's camera and microphone?

If managed, do you have IT policies in place that restrict the usage of the device local storage (i.e. device-level or SD card)?

Does the device access enterprise resources or services only when within a corporate network perimeter (where there may be other security detection/enforcement servers or appliances active), or when outside such a corporate network perimeter?

Once environmental factors have been established by administrators those answered may be given a type of weighted score that is then used to adjust the base risk score of a CVE accordingly, i.e. a CVE describing a threat that is not present or mitigated by the environment as indicated in responses to the questions may be downgraded to a less severe threat. For example, a CVE for a device that is not present in the environment may be ignored. In another example, a CVE reporting an exploit may be reduced in severity (e.g., high to medium) if the access required to perform that exploit is not permitted within the enterprise environment. If no custom applications are used, then exploits that would be vetted and eliminated for applications obtained through a walled application store may be ignored. Accordingly, the severity of that vulnerability could be reduced. In at least one embodiment, when a device with a vulnerability is introduced, the risk score can be adjusted based on the introduction of the new vulnerability, and/or other factors (e.g., environmental factors). Based on the updated risk score, the CVE can be adjusted (e.g., high, medium, low). In some embodiments the risk score and the CVE can be adjusted in accordance with the impact of events on the risk score, such events may include a new device being introduced to the environment, a device being updated, a device being reset, an application being installed on device, and/or a new policy being implemented in the enterprise (e.g., location access policy, etc.).

In some embodiments, the scoring module 506 may further have its operation modified or otherwise controlled by a scoring methodology 510 in the customization database 502. The scoring methodology 510 may be input by an administrator and be a modification of, or alternative to, the standard CVSS methodology, that takes into consideration more nuanced criteria that are unique to mobile devices 104 that are managed using a MDM or according to the methods disclosed herein. The scoring methodology 510 may then be used by the scoring module 506, such as in the place of a conventional CVSS scoring methodology. The customized scoring methodology may be used in combination with or in place of the custom environmental criteria 504 and customization module 508.

In some embodiments, the environmental factors as received from an administrator may provide a baseline environmental risk independent a particular vulnerability according to CVSS: it may introduce risk that is present regardless of details of a particular CVE. Accordingly, this baseline risk value may be added to risk values for a particular CVE. A baseline environmental risk may be an aggregation of application scores and device security scores for devices 104 in the environment as determined according to the approach of FIGS. 1 through 3 or FIGS. 7 through 9 as described below. In at least one embodiment a financial risk cost (cost of financial harm) can be associated with a plurality of devices (e.g., organization devices, department devices). The financial risk cost can be determined based on a plurality of identified risks, potential cost of breach for each risk, reputation cost, data breach fines (can be adjusted to enterprise), productivity costs, and/or the likelihood of risk exploitation (can be based on an analysis of a plurality of devices). In some embodiments, the financial risk cost can be provided with a plurality of costs and the associated probability. For example, a financial risk cost can be 20% chance of $10,000 loss, 50% chance of $300,000, and 30% chance of $500,000 loss. In some embodiments the financial risk cost can be display in a graph including the likelihood of occurrence percentage and the associated cost. In at least one embodiment the likelihood of risk exploitation can be determined using AI (e.g., machine learning) techniques to determine the likelihood of risk exploitation based on a data set of device data (e.g., data about a plurality of devices).

In at least one embodiment, the enterprise administrator can input scenarios (e.g., no MDM managed devices, prohibit social media applications, limit access to certain corporate resources) and based on the information known about the enterprise, and about risks, the financial harm of risk and/or likelihood of occurrence can be displayed.

The result the system 500 may be a security report 512 that indicates the vulnerability of a device 104 and that has been customized according to one or both of the custom environmental criteria 504 and the scoring methodology 510. In this manner, an administrator will have a more accurate view of threats and their severity since the environment of the enterprise has been accounted for.

In at least one embodiment, a device may have a user partition and an enterprise partition. It may only be possible to determine a score for the enterprise partition, or the user partition, or both. In at least one embodiment, the score can be determined for each partition of the two or more partitions of the device and a total score can be determined based on a combination of the two or more partition scores. The total score can be determined using a weighted score of the two or more partitions based on the sensitivity of data accessed by the associated partition. For example, a device can have a partition A that is used to access sensitive data (e.g., enterprise apps, banking apps, etc.) and a partition B having no access to sensitive data. The scoring methodology may be based on a plurality of factors (such as environmental factors or any of the approaches for calculating a security score as described herein) and can determine that partition A has a high security score, and partition B has a low security score. The total score of the device can be determined based on a weighted combination of the partition scores, where the weight of a partition score for a partition increases with the sensitivity of data accessible by that partition. In the example above, the device may be associated with a high security score because although partition B has a low security score, it is not used to access sensitive data. FIG. 6 illustrates a method 600 that may be executed using the system 500, such as by the administrator module 108. The method 600 may include receiving 602 custom environment criteria 504. These may be received in the form of responses to queries issued to an administrator as discussed above, the queries requesting information regarding the environment in which devices 104 of the enterprise operate.

The method 600 may also include receiving 604 a scoring methodology 510. In some cases, the scoring methodology 510 is omitted. In others, it is used in place of the custom environment criteria 504 or in combination with the custom environment criteria. Receiving 604 the scoring methodology 510 may include receiving scoring rules or modification to scoring parameters based on the environment of the enterprise.

The method 600 may include receiving 606 security data from a mobile device 104 or about a mobile device (e.g., CVEs that relate to hardware or software on the mobile device 104). The security data may be processed 608 to generate 608 a report. Step 608 may include applying a conventional CVSS methodology, a CVSS methodology as modified by a custom scoring methodology 510 from step 604, or exclusively using the scoring methodology 510.

The method 600 may then include applying 612 the custom environment criteria 504 to the report to obtain a modified report. This may include modifying severity labels (none, low, medium, high, critical) of vulnerabilities or generating a custom section of the report based on the custom environment criteria 504. Step 612 may include modifying one or both of the base score and temporal score of the report. Step 612 may be performed in combination with or in place of the use of a custom scoring methodology 510.

Figure 7:
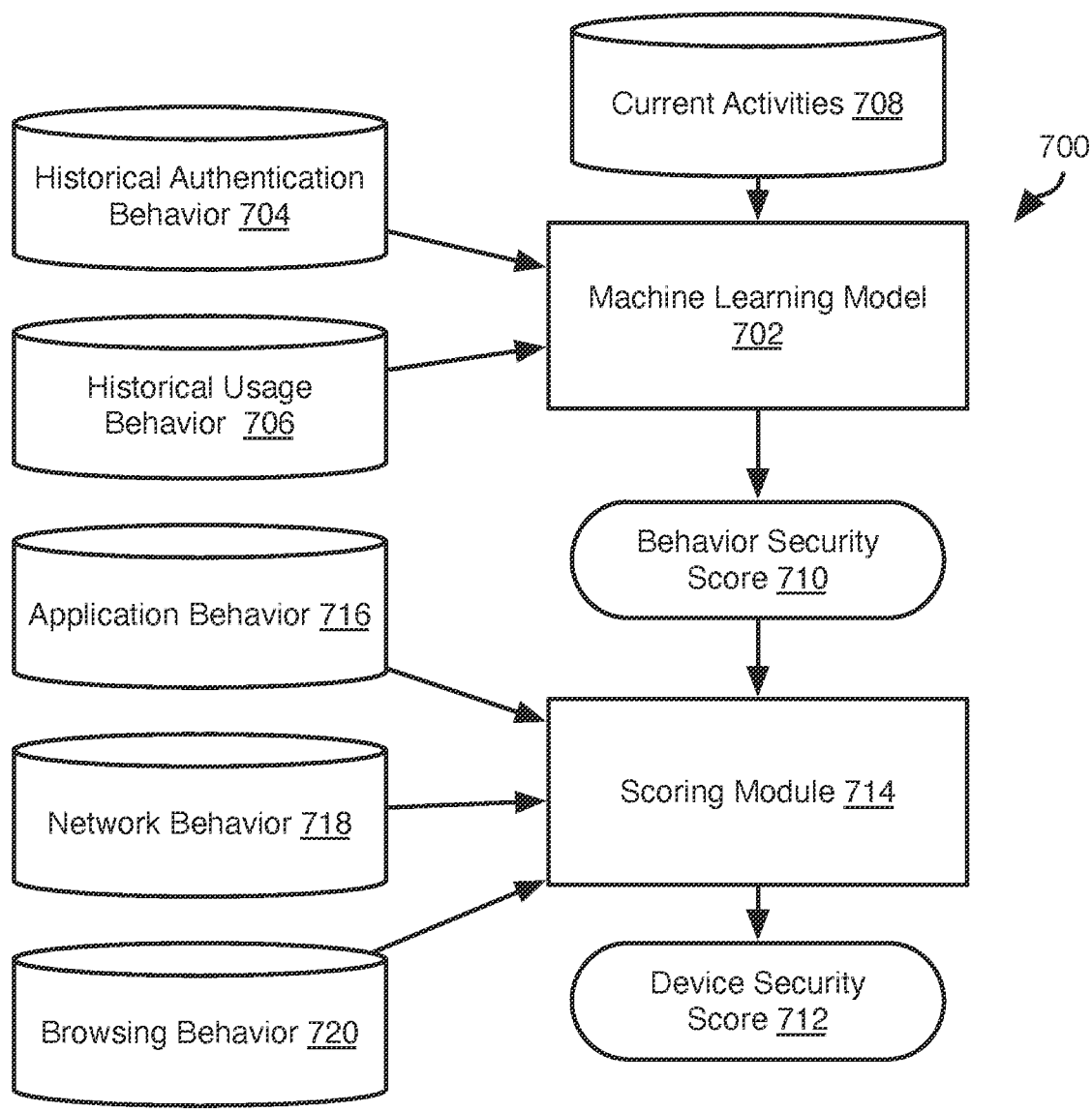
FIG. 7 is a schematic block diagram illustrating an approach for locally generating a security score for a device based on user behavior in accordance with an embodiment of the present invention.

Referring to FIG. 7, in an enterprise in which many users bring their own devices 104 and in which the devices 104 are accessing the data and services 110 of the enterprise by way of external networks, conventional approaches to security, such as firewalls, are not effective. Access from external networks and by possibly compromised devices 104 leaves an enterprise vulnerable to attacks by malicious insiders, compromised accounts, data exfiltration, and account privilege escalation. In addition, where devices 104 are used for personal activities, conventional approaches to monitoring and detecting threats may be too invasive.

The illustrated system 700 illustrates an approach for improving the security of a device 104. A machine learning model 702 may be trained using data describing typical or baseline behavior of the user, such as historical authentication behavior 704 and historical usage behavior 706.

Historical authentication behavior 704 describes aspects of the user behavior when authenticating and may include such things as a number of failed attempts (e.g., per week, month, or other time interval), typical login times, typical login locations, network from which the user logs in using the device 104, or other behavior describing circumstances of the user logging in.

Historical usage behavior 706 may include data describing such things as typical device holding, typical device posture during use, typical typing behavior, typical tapping behavior, typical application usage (which applications, what times, how often, etc.), typical browsing behaviors (typical sites, categories of sites, topics of sites, etc.). As known in the art, some behaviors (which include various behavioral biometrics) may indicate theft of a device. Accordingly, baseline values for these threat-indicating behaviors may be included in the usage behavior 706.

The data 704, 706 may be input to a machine learning algorithm executing on the device 104 of the user to train the machine learning model 702 to identify typical authentication and usage behavior. The machine learning algorithm and machine learning model 702 may include any approach known in the art for performing anomaly detection. The machine learning model 702 may be trained over time as additional data 704, 706 is collected.

As an alternative, the machine learning model 702 may be trained on the user device 104 and then provided to a server system 102, which then uses the machine learning model 702 as described below. As another alternative, the machine learning model 702 is trained on the server system 102 and then provided to the device 104, which then uses the machine learning model 702 as described below.

The current activities 708 of the user may be processed according to the machine learning model 702, i.e. values for authentication behavior 704 and usage behavior 706 captured over recent time window, such as the last week, month, or other interval. The result of application of the machine learning model to the current activities 708 may be a behavior security score 710, such as a probability that the current activity 708 are anomalous and possibly the result of an attacker or malicious module operating the device 104. In some embodiments, the behavior security score 710 is two scores, a authentication score based on authentication behavior processed using a first model trained with the historical authentication behavior 704 and a usage score based on usage behavior processed using a second model trained with the historical usage behavior 706. The training of the machine learning model 702 may be performed using any approach for user and entity behavior analytics (UEBA) known in the art.

In some embodiments, the device 104 may be assigned a security score 712 by a scoring module 714 executing on the device 104, the security score 712 indicating a level of risk associated with the current state of the device 104. The security score 712 may simply be a value along a range of values indicating severity of risk but lacking any reference to personal identity information or any other data describing activities of the user on the device 104. The scoring module 714 may take as inputs application behavior 716, network behavior 718, and browsing behavior 720.

The application behavior 716 may include a plurality of factors describing applications on the device 104, each of which is weighted or otherwise assigned a score by the scoring module 714 to indicate its contribution to the overall risk of the device 104. These factors may include:
 malware (number and level of risk)
 number of undesired applications
 number of side-loaded applications (e.g., not obtained from an application store or other trusted source)
 number of applications accessing cloud storage
 number of messaging applications
 number of applications that are out of date (not updated to latest version or not updated within the last N months, where N is a predefined number)
 number of applications that are no longer available in an application store
 total number of applications
 reputation scores of developers of applications
 global popularity of applications
 popularity of applications within an industry sector
 enterprise-wide popularity of applications
 enterprise-wide popularity of application by user job role.

Note that application popularity numbers, such as "Enterprise-wide popularity" of applications, may be determined in a privacy-preserving manner. For example, hashes of identifiers of applications on devices 104 may be reported to the server system 102. The server system 102 makes a count of the number of occurrences of each hash in reports to the server system 102. The server system 102 may then return a mapping of each hash to its count to the devices 104, which may then determine the popularity (e.g., high count=high popularity) of their applications 104 from the mapping. In other embodiments, homomorphic encryption may be used to obtain a count of applications without providing the actual identity of applications to the server system 102.

The network behavior 718 may include a plurality of factors describing network configuration and traffic of the device 104, each of which is weighted or otherwise assigned a score by the scoring module 714 to indicate its contribution to the overall risk of the device 104. These factors may include:
 number of bytes received (over cellular data network and over wireless LAN) and variation in this number over time
 number of bytes transmitted (over cellular data network and over wireless LAN) and variation of this number over time
 number addresses with low reputation scores
 number of safe browsing blocks
 number and type of connections (port, protocol), inbound or outbound or both
 number of connections to wireless access points with low reputation scores
 whether the device 104 has been operating as a local Wi-Fi hot spot
 whether BLUETOOTH is enabled on the device 104
 the number of BLUETOOTH paired devices
 detection of suspicious DNS traffic (used for exfiltration)
 whether an the device 104 connects to a previously unknown wireless access point
 detection of a man-in-the-middle (MITM) attack
 use of a cellular data connection with wireless LAN turned off while at an enterprise office location
 detection of connection to a wireless access point at a location not typically associated with that access point (e.g., a home wireless access point identifier detected in a different city or other different location).

The browsing behavior 720 may include a plurality of factors describing browsing activities on the device 104, each of which is weighted or otherwise assigned a score by the scoring module 714 to indicate its contribution to the overall risk of the device 104. These factors may include:
 Use of non-standard browser
 number of visits at risky category sites (malwares, porn, etc.)
 number of phishing blocks (user clicked on what was a phishing site link, and access to the site is blocked)
 number of safe browsing blocks (user clicked on a link that contained dangerous content and access to the link was blocked).

Each type of behavior 716, 718, 720 may be assigned its own sub-score. The sub-scores may then be combined with the behavior security score 710 to obtain the device security score 712. Alternatively, each factor included in each type of behavior 716, 718, 720 may be combined to obtain the device security 712.

The device security score 712 may further take into account some or all of the factors and calculation approaches described above with respect to FIGS. 1 through 4. The combination of these approaches may include some or all of the following:
 Some or all of the security scores 122, 124, 126 may be combined with the sub-scores to calculate the device security score 712.
 The application behavior data 716 may be used to calculate the application security score 122. Likewise, the application security score 124 may be calculated in the same manner as the sub-score based on the application behavior data 716. Alternatively, the sub-score based on the application behavior data may be calculated in the same manner as the security score 124 as described above with respect to FIGS. 1-4.

The security score 124 based on device data 118 may be used to calculate the sub-score based on network behavior data 718. Alternatively, the security score 124 may be calculated using the network behavior sub-score or based on the network behavior data 718.

The security score 126 based on user data 120 may be calculated as described above with respect to FIGS. 1-4 and may additionally or alternatively be calculated based on some or all of the behavior security score 710, the sub-score based on network behavior 718, and the sub-score based on browsing behavior 720. Likewise, the data used to calculate the security score 126 may be used to calculate the sub-score based on browsing behavior data 720 or the sub-score based on network behavior data 718.

The device security score 712 may have various forms. It may be a binary score: acceptable risk vs. unacceptable risk. The device security score 712 may be multiple binary scores: a pass/fail indication for various types of risk: pass/fail with respect to malware, pass/fail with respect to whether the device 104 requires a passcode, pass/fail whether the device 104 is rooted, pass/fail whether the device has been subject to a MITM attack, or the like.

The device security score 712 may be a numerical value, such as a value from 0 to 1000, with 0 indicating very low risk and 1000 indicating very high risk. Alternatively, the direction may be reversed with 0 indicating very high risk and 1000 indicating very low risk. The device security score 712 may include multiple scores based on the behaviors 716, 718, 720 evaluated, e.g., one reflecting the number of out-of-date applications with 0 indicating no-out of date applications and 1000 indicating the number of out of date applications is higher than a maximum value (e.g., 10). In another example, a device security score 712 is 0 when no enterprise data is stored on the device 104 and is 1000 when the amount of data is higher than a maximum value (e.g., 10 GB).

The security score 712 may further take into account the information and methods described above with respect to FIGS. 1-4. In particular, the security score 712 may further be a function of the application score, device score, and/or user score as described above with respect to FIGS. 1 through 4. The security score 712 may further be a function of a security report 512 for a device 104 or vulnerability of a device as described above with respect to FIGS. 5 and 6.

Figure 8:
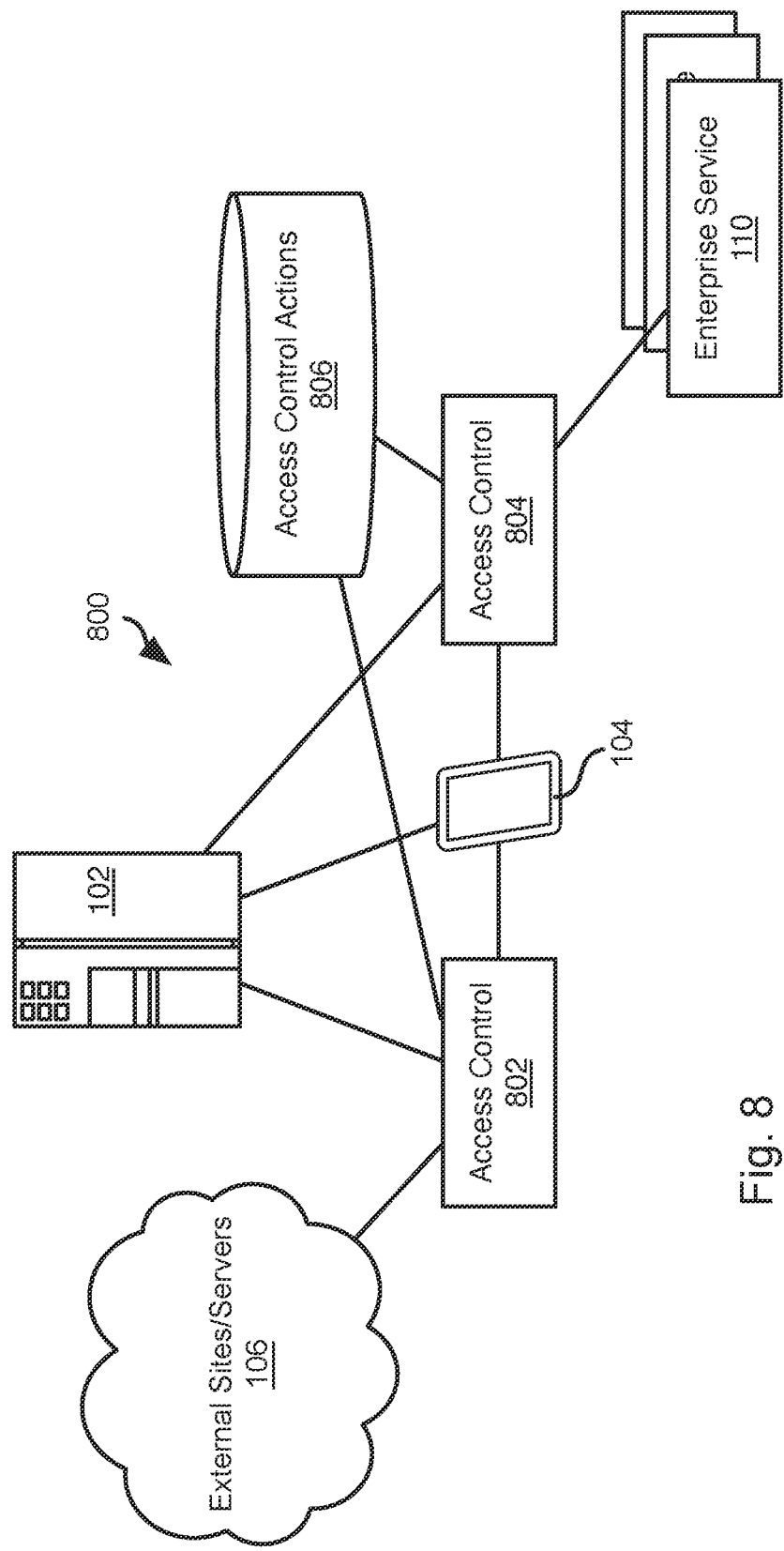
FIG. 8 is schematic block diagram of an approach for implementing a security on a mobile device using a locally-generated security score in accordance with an embodiment of the present invention.

Referring to FIG. 8, the illustrated system 800 may be implemented in order to control access of the device 104 based on a device security score. The device 104 may implement access controls 802 that determine the access of the device 104 to external sites: news, search engines, entertainment, social media etc. The device 104 may implement access controls 804 that determine access to enterprise services 110 or to third party services provided to the enterprise. The device 104 may provide a device security score 712 to the server 102. The server 102 determines access controls 802, 804 to implement based on that security score 712 and instructs the device 104, e.g. the client module 112, to implement the access controls 802, 804.

Alternatively, the server system 102 may provide a database 806 of access control actions, each associated with a device security score 712 or range of device security scores 712. The client module 112 may therefore select which access control actions to use for the access controls 802, 804 based on the self-calculated device security score.

Examples of access controls 802 may include blocking access to third party sites, block access to third party sites with reputation scores below a threshold, blocking access to certain categories of third party sites, or other actions.

Examples of access controls 804 may include requiring authentication, requiring two-factor authentication, requiring authentication each time access is performed (i.e., no use of stored credentials), blocking of access, blocking access unless on an enterprise office network, or other limitation on access.

Figure 9:
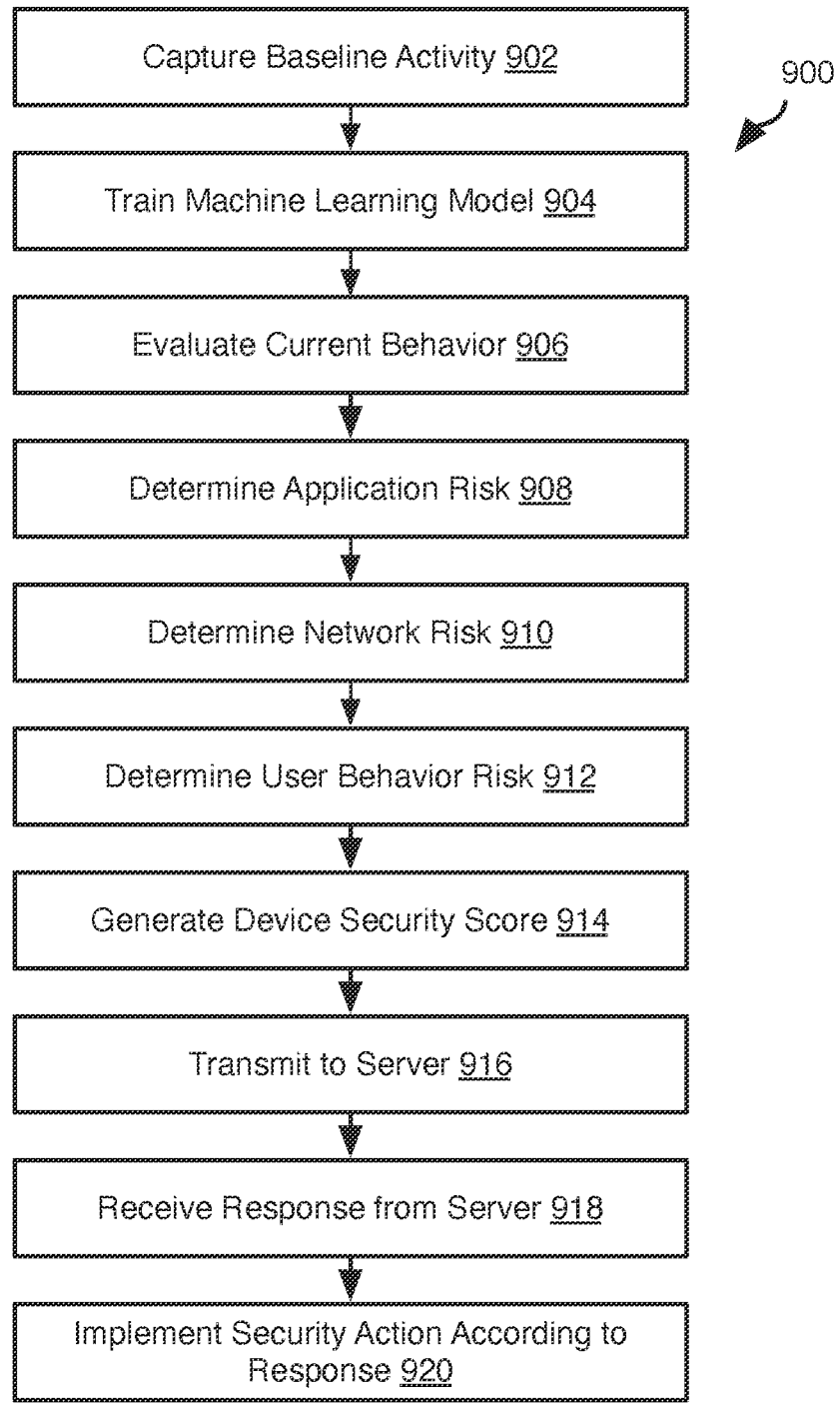
FIG. 9 is a process flow diagram of a method for locally generating a security score and implementing security actions in accordance with an embodiment of the present invention.

Referring to FIG. 9, the systems 700 and 800 may be used to implement the illustrated method 900. The method 900 may be executed by the client module 112 except where otherwise noted.

The method 900 may include capturing 902 baseline activity, which may include baseline measurements of the authentication behavior 704 and usage behavior 706. This may occur over a time period, such as a week, month, or some other time period.

The method 900 may include locally training 904 a machine learning model 702 to detect anomalies in authentication behavior and usage behavior on the device 104. The current activities 708 of the user may then be collected periodically over a predefined time window and evaluated 906 with respect to the machine learning model 702 to obtain a behavior security score 710, which may be a pair of scores (authentication score and usage score) in some embodiments.

The method 900 may include evaluating 908, 910, 912 application risk, network risk, and user behavior risk according to the application behavior 716, network behavior 718, and browsing behavior 720 as described above. The behavior security score 710 may be combined with sub-scores based on the application risk, network risk, and behavior risk to generate 914 the device security score 712. Note that any one of the scores including the behavior security score 710 and the sub-scores indicating application risk, network risk, and behavior risk can be valuable to characterize the security risk of a device 104. Accordingly, in some implementations of the method 900, only one of these scores is calculated and used or any possible subset of these scores may also be used in place of using all of these scores.

The device security score 712 may be transmitted 916 to the server 102. In some embodiments, the score 712 is transmitted in such a way that a human user cannot identify the user of the device 104 in order to preserve privacy. In other embodiments, no information other than a user identifier of the user using the device 104 is provided with the security score and no other information that would compromise the privacy of the user is provided.

The server 102 receives the security score 712 and selects corresponding security actions for the access controls 802, 804. The server 102 transmits a response to the device security score 712 to the device 104. The device 104 receives 918 the response and implements 920 the security actions indicated in the response. This may include programming the access controls 802, 804 to remove or add restrictions to access of third party sites and enterprise services 110 or third party services provided to the enterprise.

In some embodiments, the administrator and/or user can view the financial harm prevented value. The value can be one value, or a plurality of values and the likelihood of the occurrence. The financial harm prevented value can be based on the risks addressed (e.g., phishing sites blocked, applications blackholed, etc.), and the associated financial risk cost. In some embodiments, the average financial risk cost can be used in the calculation and in others, a plurality of costs and associated likelihoods of occurrence.

Figure 10:
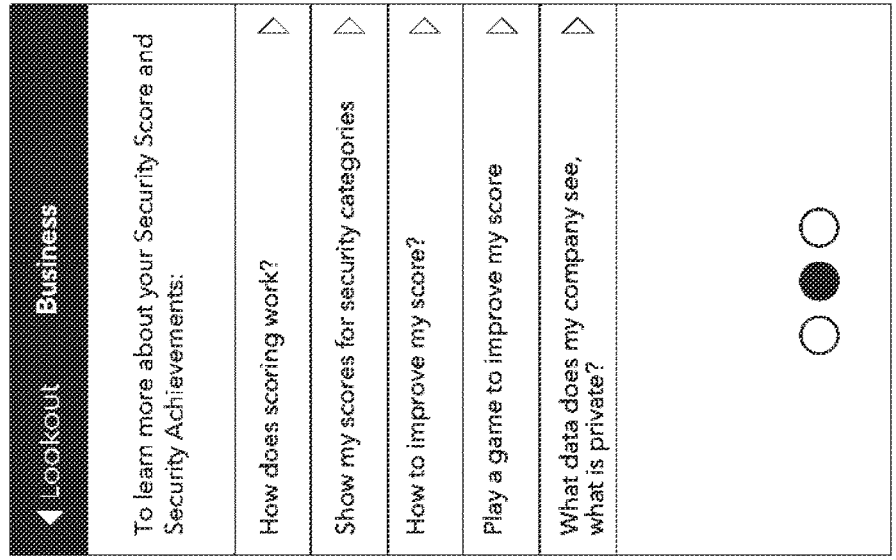
Figure 11:
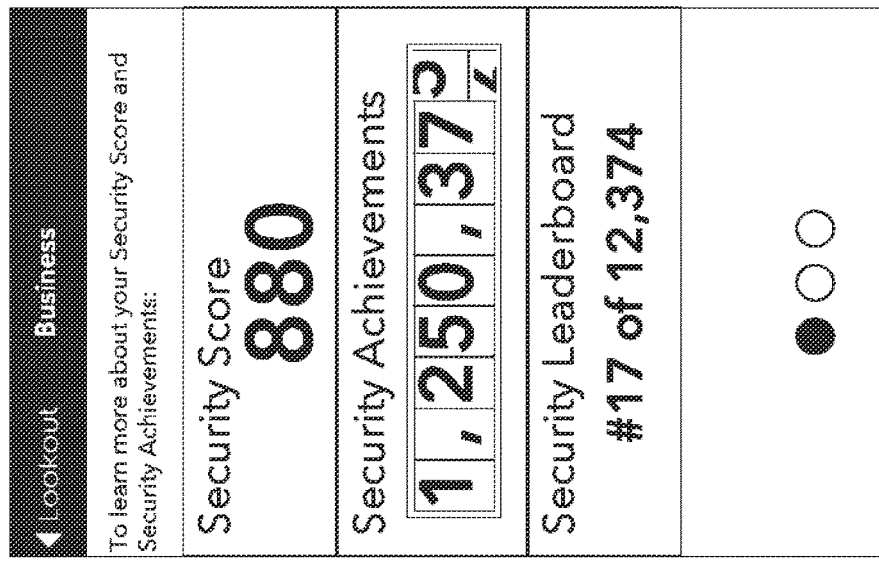

Referring to FIGS. 10, 11, and 12, the device security score 712 may be used to encourage a user of the device 104 to reduce risk. Referring specifically to FIG. 10, the user may be presented with the device security score 712, "880" in the illustrated interface. For purposes of encouragement, a user may be more motivated by a desire to increase a value. Accordingly, the device security score 712 may be defined such that a high score indicates less risk or may be transformed to have this property and a transformed version displayed.

The interface may further list a number of actions performed by the user that will reduce risk ("Security Achievements 1,250,375"). Such actions may include configuring the device to require a passcode, going a predefined time period without safe browsing blocks, going a predefined period of time without clicking on a phishing link, or performing going a time period without performing application, network, or browsing behaviors 716, 718, 720 described above that result in increased risk. The interface may also include a high score among users associated with the enterprise and the user's rank among those users ("Security Leaderboard") to encourage users to compete to reduce risk. The display of a security score or security achievements to a user can be especially important when devices are BYOD or unmanaged devices.

Referring to specifically to FIG. 11, another interface may provide links to information informing the user of ways to increase their security score and to acquire security achievements. Referring specifically to FIG. 12, another interface may list components used to compute the device security score, including scores for device risk, application behavior, network behavior, browsing behavior, authentication behavior, and user behavior as defined above. The interface may further link to data used to derive these scores and educational materials instructing the user how to decrease risk.

The illustrated interfaces of FIGS. 10, 11, and 12 are exemplary only and other approaches may be used to encourage risk-reducing behaviors. For example, a user may be presented with quizzes (e.g., "which of these links is a phishing link?") to assess the user's knowledge of risk reducing behavior, with the user's score on the quizzes being used to augment the user's security score. Quiz questions could be incorporated into other games to engage a user.

Figure 13:
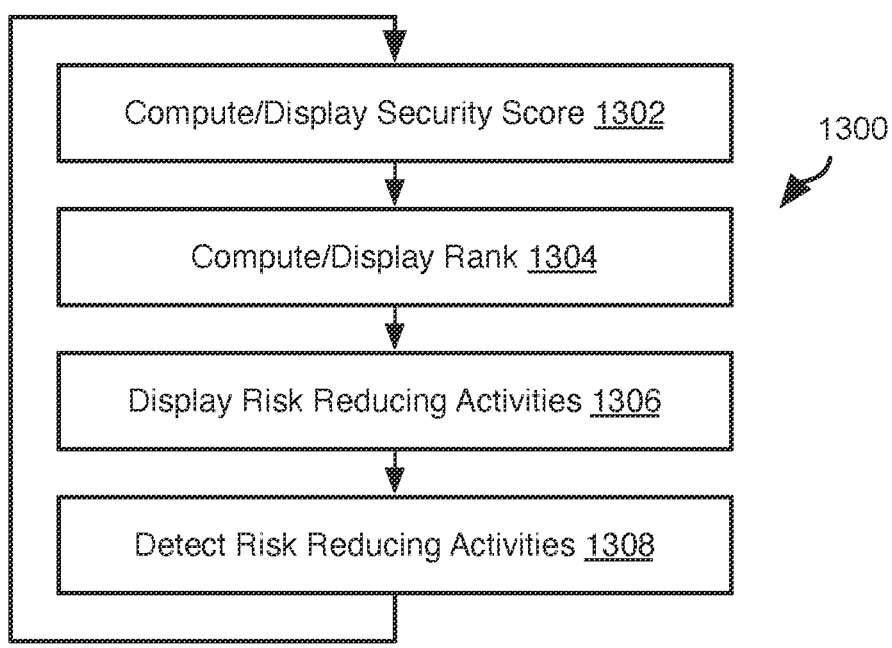
FIG. 13 is a process flow diagram of a method for promoting device security in accordance with an embodiment of the present invention.

Referring to FIG. 13, the illustrated method 1300 may be performed on the device 104 alone or in combination with the server system 102. The method 1300 may include calculating and displaying 1302 on the device 104 a security score of a user as a function of some or all of the factors noted above as being used to calculate the security score 712. The method 1300 may include calculating and presenting 1304 a rank of the security score of the user relative to other users of the enterprise.

The method 1300 may include displaying 1306 risk reducing activities to the user. This may be in the form of educational materials, games, real-time feedback, or other form of output. The method 1300 may include detecting 1308 risk reducing activities of the user. This may include activities that affect any of the factors described above as being used to calculate the security score 712, reviewing educational materials, or performing other actions that will contribute to reduced risk. The method 1300 may repeat starting step 1302 with computation and display of an updated score based on the activities detected at step 1308.

Figure 14:
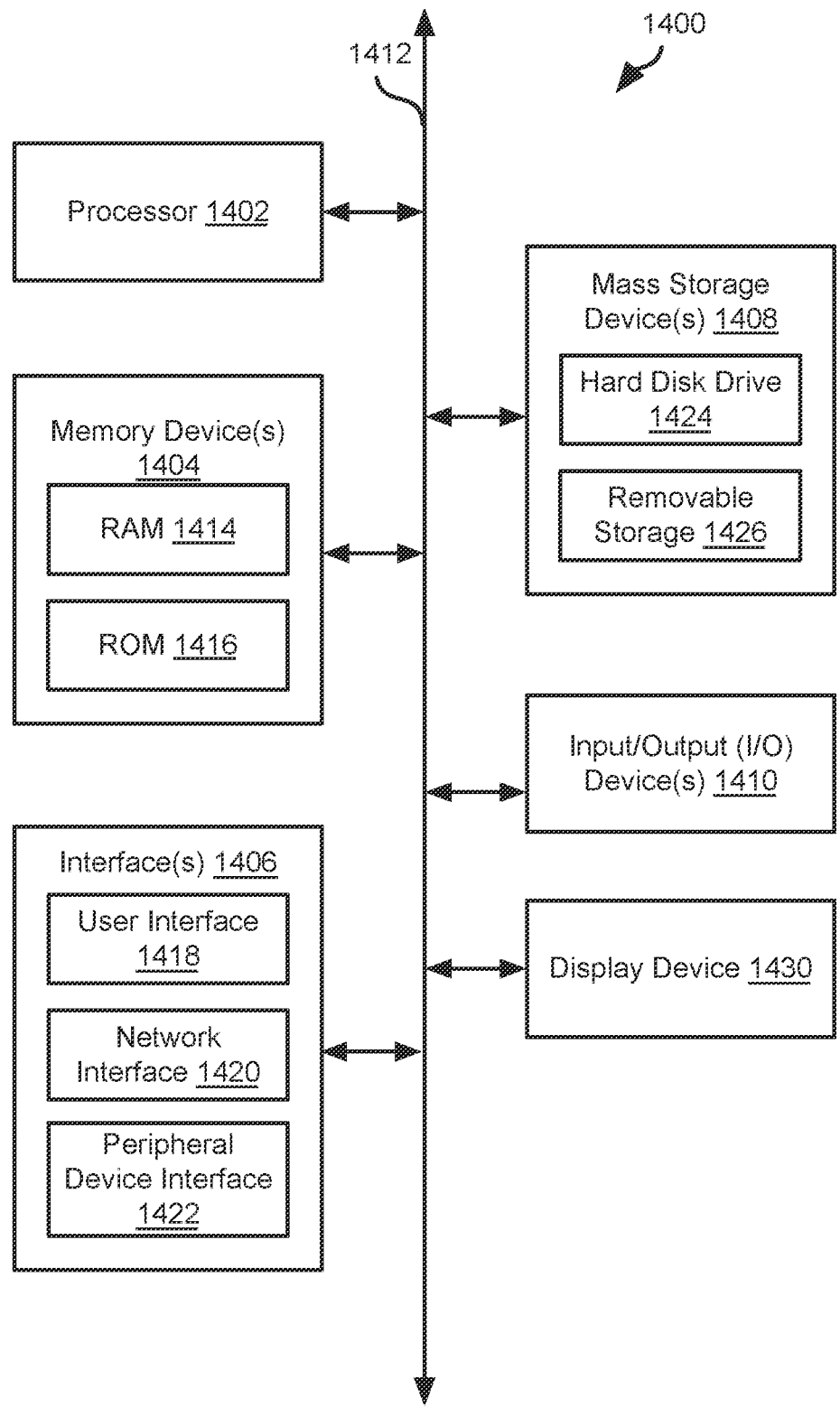
FIG. 14 is a schematic block diagram of a computer system suitable for implementing methods in accordance with embodiments of the present invention.

FIG. 14 is a block diagram illustrating an example computing device 1400 which can be used to implement the system and methods disclosed herein. The one or more computers of the server system 102 and the devices 104 may have some or all of the attributes of the computing device 1400. In some embodiments, a cluster of computing devices interconnected by a network may be used to implement any one or more components of the invention.

Computing device 1400 may be used to perform various procedures, such as those discussed herein. Computing device 1400 can function as a server, a client, or any other computing entity. Computing device can perform various monitoring functions as discussed herein, and can execute one or more application programs, such as the application programs described herein. Computing device 1400 can be any of a wide variety of computing devices, such as a desktop computer, a notebook computer, a server computer, a handheld computer, tablet computer and the like.

Computing device 1400 includes one or more processor(s) 1402, one or more memory device(s) 1404, one or more interface(s) 1406, one or more mass storage device(s) 1408, one or more Input/Output (I/O) device(s) 1410, and a display device 1430 all of which are coupled to a bus 1412. Processor(s) 1402 include one or more processors or controllers that execute instructions stored in memory device(s) 1404 and/or mass storage device(s) 1408. Processor(s) 1402 may also include various types of computer-readable media, such as cache memory.

Memory device(s) 1404 include various computer-readable media, such as volatile memory (e.g., random access memory (RAM) 1414) and/or nonvolatile memory (e.g., read-only memory (ROM) 1416). Memory device(s) 1404 may also include rewritable ROM, such as Flash memory.

Mass storage device(s) 1408 include various computer readable media, such as magnetic tapes, magnetic disks, optical disks, solid-state memory (e.g., Flash memory), and so forth. As shown in FIG. 14, a particular mass storage device is a hard disk drive 1424. Various drives may also be included in mass storage device(s) 1408 to enable reading from and/or writing to the various computer readable media. Mass storage device(s) 1408 include removable media 1426 and/or non-removable media.

I/O device(s) 1410 include various devices that allow data and/or other information to be input to or retrieved from computing device 1400. Example I/O device(s) 1410 include cursor control devices, keyboards, keypads, microphones, monitors or other display devices, speakers, printers, network interface cards, modems, lenses, CCDs or other image capture devices, and the like.

Display device 1430 includes any type of device capable of displaying information to one or more users of computing device 1400. Examples of display device 1430 include a monitor, display terminal, video projection device, and the like.

Interface(s) 1406 include various interfaces that allow computing device 1400 to interact with other systems, devices, or computing environments. Example interface(s) 1406 include any number of different network interfaces 1420, such as interfaces to local area networks (LANs), wide area networks (WANs), wireless networks, and the Internet. Other interface(s) include user interface 1418 and peripheral device interface 1422. The interface(s) 1406 may also include one or more user interface elements 1418. The interface(s) 1406 may also include one or more peripheral interfaces such as interfaces for printers, pointing devices (mice, track pad, etc.), keyboards, and the like.

Bus 1412 allows processor(s) 1402, memory device(s) 1404, interface(s) 1406, mass storage device(s) 1408, and I/O device(s) 1410 to communicate with one another, as well as other devices or components coupled to bus 1412. Bus 1412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1400, and are executed by processor(s) 1402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

The invention claimed is:

1. A method for characterizing security comprising:
receiving, by a computing device, a plurality of factors describing applications installed on a mobile device;
assigning, by the computing device, an application score to the plurality of factors; and
calculating a security score for the mobile device based on the application score;
wherein the plurality of factors includes one or more of:
a number of malware on the mobile device;
a level or risk associated with malware on the mobile device;
a number of the applications that are side-loaded applications not obtained from a trusted source;
a number of the applications accessing cloud storage;
a number of the applications that are messaging applications;
a number of the applications that are out of date; or
a number of the applications that are no longer available in an application store
receiving, by the computing device, authentication behavior of a user with respect to a mobile device for a time period;
processing, by the computing device, the authentication behavior to obtain an authentication score; and
combining the authentication score with the application score to obtain the security score for the mobile device;
wherein the authentication behavior includes one or more of number of failed attempts, login times, login locations, or networks used.

2. The method of claim 1, wherein processing the authentication behavior to obtain an authentication score comprises processing the authentication behavior using a machine learning model.

3. The method of claim 1, wherein the authentication behavior includes biometric data.

4. The method of claim 2, further comprising:
receiving, by the computing device, usage behavior describing usage of the mobile device by the user during the time period;
wherein processing the authentication behavior using the machine learning model comprises processing both the authentication behavior and the usage behavior.

5. The method of claim 2, wherein the machine learning model is a first machine learning model, the method further comprising:
receiving, by the computing device, usage behavior describing usage of the mobile device by the user during the time period;
processing, by the computing device, the usage behavior using a second machine learning model to obtain a usage score; and
combining, by the computing device, the usage score and the authentication score to obtain a security score for the mobile device.

6. The method of claim 1, wherein the plurality of factors includes one or more of:
reputation scores of developers of the applications;
global popularity of the applications;
popularity of the applications within an industry sector;
enterprise-wide popularity of the applications; or
enterprise-wide popularity of the applications by a job role of a user.

7. The method of claim 1, further comprising:
receiving, by the computing device, network behavior of the mobile device; and
assigning, by the computing device, a security score to the mobile device according to the application score and the network behavior.

8. The method of claim 7, wherein the network behavior comprises at least one of:
number of bytes received;
number of bytes transmitted;
number of addresses with low reputation scores;
number of safe browsing blocks;
number and type of connections including one or more of port, protocol, inbound, and outbound;
number of connections to wireless access points with low reputation scores;
whether the mobile device has been operating as wireless networking hot spot;
whether BLUETOOTH is enabled on the mobile device;
a number of BLUETOOTH devices paired to the mobile device;
detection of suspicious domain name service (DNS) traffic;
whether the mobile device has connected to a previously unknow wireless access point;
detection of a man-in-the-middle (MITM) attack;
use of a cellular data connection with wireless LAN turned off while at an enterprise office location; or
detection of connection to a wireless access point at a location not associated with that access point.

9. The method of claim 1, further comprising:
receiving, by the computing device, network behavior of the mobile device; and
combining, by the computing device, the application score with the network behavior to obtain the security score for the mobile device.

10. The method of claim 1, further comprising providing access controls to the mobile device, the access controls corresponding to the security score.

11. The method of claim 2, further comprising training the machine learning model using data describing baseline behavior of the user, the baseline behavior of the user including at least one of historical authentication behavior or historical usage behavior.

12. The method of claim 2, further comprising locally training the machine learning model on the mobile device to detect anomalies in authentication behavior and usage behavior on the mobile device.

13. The method of claim 2, further comprising:
providing a database of a plurality of access control actions, each associated with a device security; and
and selecting an access control action of the plurality of access control actions according to the security score.

14. The method of claim 13, wherein the plurality of access control actions include blocking access to third party sites with reputation scores below a threshold, requiring authentication, requiring two-factor authentication, requiring authentication each time access is performed without use of stored credentials, blocking of access, and blocking access unless on an enterprise office network.

\* \* \* \* \*